United States Patent [19]

Janicki et al.

[11] Patent Number: 5,460,852
[45] Date of Patent: Oct. 24, 1995

[54] METHOD FOR APPLYING POLYMER MODIFIED ASPHALT COATING TO CORRUGATED PIPES

[75] Inventors: Richard T. Janicki, Oak Lawn; Jay W. Keating, Tinley Park, all of Ill.

[73] Assignee: Owens-Corning Fiberglas Technology Inc., Summit, Ill.

[21] Appl. No.: 298,824

[22] Filed: Aug. 31, 1994

[51] Int. Cl.⁶ ............................. B05D 7/22; B05D 1/18; F16L 9/147
[52] U.S. Cl. ..................... 427/235; 427/239; 427/443; 138/145
[58] Field of Search .................... 427/443, 435, 427/287, 239, 231, 234, 398.1; 138/121, 127, 105, 173, 145

[56] References Cited

U.S. PATENT DOCUMENTS

| | | | |
|---|---|---|---|
| 1,303,102 | 5/1919 | Monrath | 427/239 |
| 1,403,068 | 1/1922 | Blumental et al. | 427/235 |
| 1,735,732 | 11/1925 | Cushman | 427/239 |
| 2,114,975 | 4/1938 | Camerota | 427/318 |
| 2,470,958 | 5/1949 | Stromquist | 117/49 |
| 2,963,045 | 12/1960 | Canevari et al. | 427/239 |
| 4,091,134 | 5/1978 | Uemura et al. | 428/36 |
| 4,904,713 | 2/1990 | Vonk et al. | 524/68 |
| 4,994,508 | 2/1991 | Shiraki et al. | 524/14 |

FOREIGN PATENT DOCUMENTS

| | | | |
|---|---|---|---|
| 1998621 | 7/1975 | U.S.S.R. | |
| 15011 | of 1886 | United Kingdom | 427/443 |

*Primary Examiner*—Shrive Beck
*Assistant Examiner*—Fred J. Parker
*Attorney, Agent, or Firm*—Ted C. Gillespie; C. Michael Gegenheimer

[57] ABSTRACT

A method of coating a corrugated pipe includes preparing an asphalt composition having a polymer constituent within the range of from about 3 to about 20 percent by weight, the composition having a softening point within the range of from about 180° F. to about 250° F. and a viscosity at a temperature of 360° F. within the range of from about 600 to about 4000 cps, heating the asphalt composition to a temperature within the range of from about 340° F. to about 390° F. and coating the corrugated pipe by positioning at least a portion of the corrugated pipe in the heated asphalt composition for a time sufficient for the corrugated pipe to reach a temperature of at least 150° F. The coated pipe is then removed from the asphalt composition for cooling.

19 Claims, 1 Drawing Sheet

METHOD FOR APPLYING POLYMER MODIFIED ASPHALT COATING TO CORRUGATED PIPES

TECHNICAL FIELD

The present invention relates to asphalt coatings for corrugated pipes, and in particular to a method for coating the invert of a corrugated culvert pipe with a polymer modified asphalt.

BACKGROUND OF THE INVENTION

Asphalt coatings have long been used to protect corrugated pipes against wear and corrosion for improved service life. Asphalt coatings have been applied by spraying, flowing or dipping asphalt over corrugated pipe surfaces, as noted by Cushman, U.S. Pat. No. 1,735,732, issued Nov. 12, 1929. The adherence of asphalt coatings may be improved by preheating pipe surfaces to approximately the temperature of the coating material prior to immersion in asphalt, as disclosed by Camerato, U.S. Pat. No. 2,114,975, issued Apr. 19, 1938.

The problem of adherence of asphalt coating materials to corrugated metal pipes remains, however, as abrasion and wear cause poorly bonded coatings to delaminate. As well, flood coated pipes are subject to delamination in chunks, and the heavy coating of asphalt in the troughs produced by flood coating further adds cost and weight to the coating. Accordingly, the need exits for improved asphalt coating materials, and improved methods for application of coating materials.

SUMMARY OF THE INVENTION

The present invention satisfies both needs with a method for applying a polymer modified asphalt to the invert of a corrugated pipe.

In accordance with the present invention, the method includes first preparing an asphalt composition having a polymer constituent within the range of from about 3 to about 15 percent, the composition having a softening point within the range of from about 180° F. to about 250° F. and a viscosity at a temperature of 360° F. within the range of from about 600 to about 4000 cps, next heating the asphalt composition to a temperature within the range of from about 340° F. to about 390° F. and then coating the corrugated pipe by positioning at least a portion of the corrugated pipe in the heated asphalt composition for a time sufficient for the corrugated pipe to reach a temperature of at least 150° F. The coated pipe is thereafter removed from the asphalt composition for cooling. The pipe can be removed from the asphalt composition by any suitable method, such as by draining the asphalt from a tank or container in which the pipe is placed, or by hoisting the pipe, either containing or with a mechanical hoist, from the tank or container containing the asphalt composition. All percentage expressed in the specification and claims are in terms of weight percent. The asphalt viscosities are measured using a Brookfield thermocell in a temperature range of from about 300°F. to about 450° F.

Controlling the temperature of both the polymer modified asphalt coating material and the portion of the corrugated pipe substrate in contact therewith produces superior bonding of the coating material to the pipe. Improved qualities of polymer modified asphalts may thereby be obtained in a bonded coating to enhance the abrasion resistance and useful life of corrugated pipe. These and other advantages of the present invention will be apparent from the drawings and detailed description set forth below.

DETAILED DESCRIPTION OF THE PREFERRED EMBODIMENTS

Figure 1:
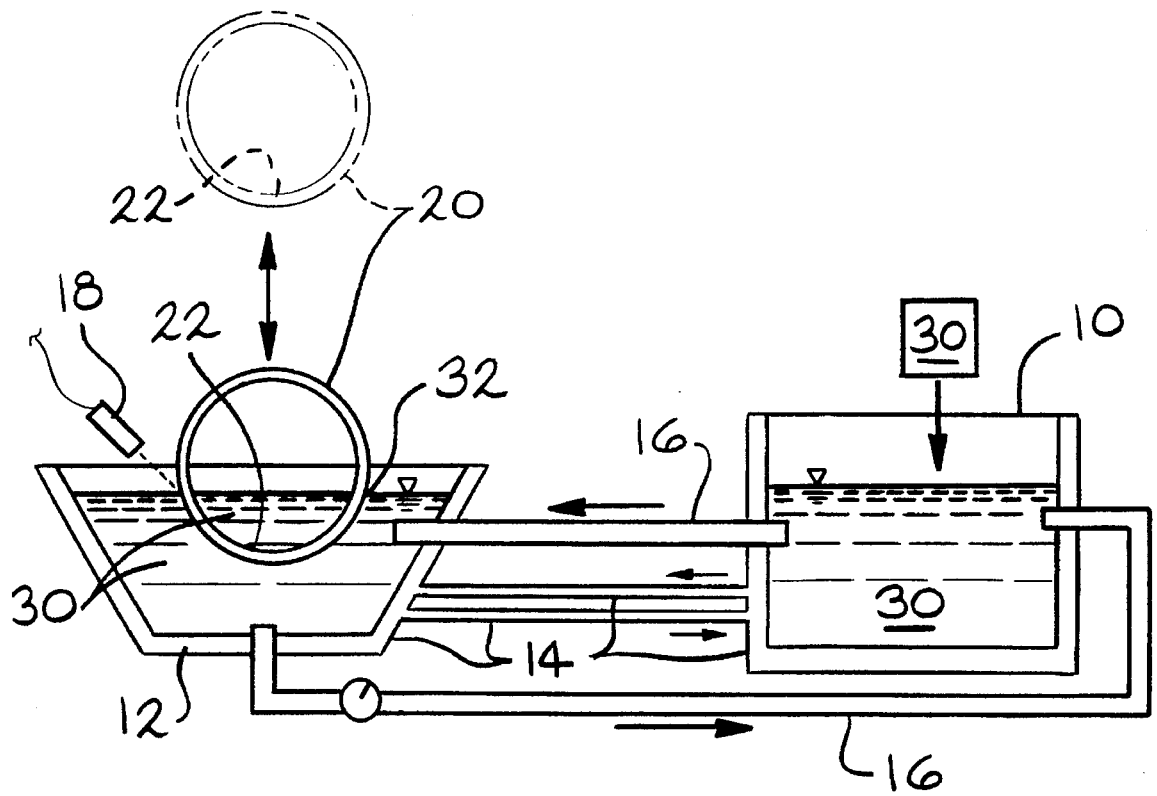
FIG. 1 is a schematic view illustrating the method of the present invention.

Referring to FIG. 1, the method of the present invention is illustratively shown as practiced with an asphalt melter 10 and dip pan 12. Preferably both are provided with a heating means, such as an interconnected hot oil jacket system 14, and a hot asphalt composition 30 is circulated between the melter 10 and dip pan 12 by way of asphalt circulation lines 16 and a pump (not shown). Valves and instrumentation and control devices, including at least one temperature gauge, (not shown) are located as needed to control the flow of asphalt 30 and hot oil, and monitor the asphalt temperature in the dip pan 12. The temperature of the corrugated pipe 20 may be best measured with a heat gun sensor 18 pointed just above the asphalt line 32 on the pipe 20.

Corrugated steel pipe 20 as referred to herein includes spiral, spiral rib, "ridged", welded concentric rib, and multiplate corrugated pipes, and such other pipes as are generally understood in the art to be of like structure. The corrugated pipe 20 may also be referred to herein as a "substrate".

In accordance with the method of the present invention, polymer modified asphalt 30 is applied to the invert 22 of a corrugated pipe 20 by first preparing an asphalt composition having a polymer constituent within the range of from about 3 to about 15 percent by weight, the composition having a softening point within the range of from about 180° F. to about 250° F., and a viscosity at a temperature of 360° F. within the range of from about 600 to about 4000 centipoises (cps). One such polymer modified asphalt is TruFlow™ commercially available from Owens-Corning/Trumbull, Toledo, Ohio. Unlike asphalts conventionally used for coating pipe inverts, polymer modified asphalt has greater resiliency, which has been found to improve the abrasion resistance of the coating in corrugated pipe applications. Typical asphalt modifiers, generally known to those skilled in the art, can be used. Examples include rubber such as SBS, SBR, SEBS, and butyl, and other polymers.

The method next calls for heating the asphalt composition to a temperature within the range of from about 340° F. to about 390° F. The temperature should not exceed, in any event 410° F. Coating the corrugated pipe 20 is then performed as shown in FIG. 1 by positioning at least a portion of the corrugated pipe 20 in the heated asphalt composition 30 for a time sufficient for the corrugated pipe 20 to reach a temperature of at least 150° F. The time for submersion has been found to be from approximately 3 minutes to 20 minutes depending on the pipe size and wall thickness. The coated pipe is thereafter removed from the asphalt composition for cooling. Excess asphalt is drained at this time by tipping the pipe.

Figure 2:
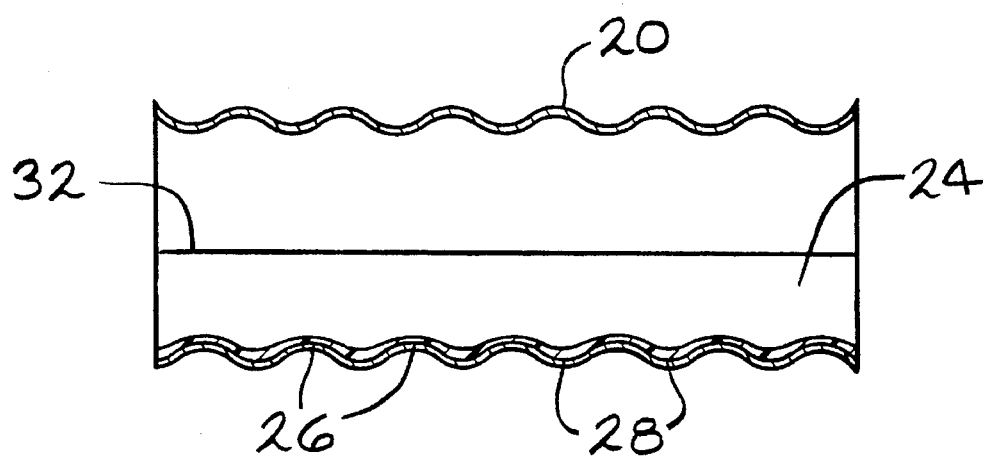
FIG. 2 is a cross-sectional view of a corrugated pipe having a coating applied in accordance with the present invention.

As best shown in FIG. 2, the resulting coating 24 at the crests 26 of the corrugated pipe 20 is within the range of from about 40 mils to 100 mils, and preferably from about 50 mils to 90 mils. The thickness of the coating 24 at the troughs 28 of the corrugations is within the range of about 100 to 175 percent of the thickness of the crests, but is preferably between 100 and 150 percent, and optimally between 100 and 125 percent of the thickness of the crests to reduce the weight and cost of the asphalt coating. Unlike the generally flat asphalt coating left by flood coating, the coating 24 formed by the present invention retains a corrugated appearance.

In the preferred embodiment of the present invention, the step of preparing a polymer modified asphalt composition 30 includes preparing an asphalt composition having a softening point within the range of from about 200° F. to 250° F. and a viscosity at a temperature of 360° F. within the range of from about 1200 to about 3000 cps. The step of heating preferably is performed within the range of from about 350° F. to about 370° F.. Coating is preferably performed for a time sufficient for the corrugated pipe 20 to reach a temperature of at least 170° F. or optimally, a temperature in the range from about 190° F. to about 200° F.

The present invention is preferably practiced without pre-coating or pre-heating of the corrugated pipe 20. Thus, the method may be practiced beginning with corrugated pipe 20 at ambient temperatures, which includes temperatures less than approximately 110° F..

Alternatively, one could preheat at least the portion of the corrugated pipe 20 which is to be coated. However, inclusion of a preheating step is less efficient than the preferred method of the present invention which heats portions of the pipe by submersion for a necessary time period. The present method of heating by at least partial immersion is preferred over preheating as it eliminates an additional production step, and eliminates related costs of auxiliary heating equipment, the handling of hot pipes, and additional energy consumption spent heating unnecessary portions of the pipe 20.

Typically, approximately 25 to 30% of the corrugated pipe, the portion which is typically subject to erosion in many applications, is submerged in the dip pan 12. Thus, heating of only a portion of the pipe 20 is required. Measurement of temperature just above the asphalt coating line 32 on the pipe surface assures that the corrugated pipe "substrate" 20 is fully heated for improved adherence and bonding. While a heat gun sensor 18 is preferred, alternative known devices and sensors for pipe temperature measurement may be used.

Thus while coatings 24 have long been applied to corrugated pipe inverts 22, it has been found in accordance with the low cost, efficient method of the present invention that control of the temperature of the asphalt composition 30 and corrugated pipe substrate 20 to apply a coating 24 of polymer modified asphalt provides superior bonding between the coating 24 and corrugated pipe substrate 20.

While certain representative embodiments and details have been disclosed for purposes of illustrating the present invention, it will be apparent to those skilled in the art that various changes in the method and system disclosed herein may be made without departing from the scope of the invention, which is defined in the appended claims.

We claim:

1. The method of coating a corrugated pipe, having crests and troughs, comprising:
   a. preparing an asphalt composition comprising asphalt and an added, asphalt-modifying polymer constituent which is within the range of from about 3 to about 20 percent by weight of the asphalt composition, the asphalt composition having a softening point within the range of from about 180° F. to about 250° F., and a viscosity at a temperature of 360° F. within the range of from about 600 to about 4000 cps,
   b. heating the asphalt composition to a temperature within the range of from about 340° F. to about 390° F.,
   c. coating the corrugated pipe by positioning at least a portion of the corrugated pipe in the heated asphalt composition for a time sufficient for the corrugated pipe to reach a temperature of at least 150° F., the coating being effective to coat both the crests and the troughs of the portion of the corrugated pipe, with the coating thickness of the troughs being within the range of from about 100 percent to about 175 percent of the thickness of the coating at the crests, thereby producing a coated corrugated pipe with substantially the entire portion of the corrugated pipe that is coated with the asphalt composition retaining a corrugated appearance, and
   d. removing the pipe from the asphalt composition for cooling.

2. The method of claim 1 in which the coating at the crests of the corrugations is within the range of from about 40 mils to about 100 mils.

3. The method of claim 1 in which the thickness of the coating at the troughs of the corrugations is within the range of from about 100 percent to about 125 percent of the thickness of the coating at the crests of the corrugations.

4. The method of claim 1 in which the temperature of the corrugated pipe is lower than 110° F. immediately prior to the positioning of the corrugated pipe in the heated asphalt composition.

5. The method of claim 1 comprising heating the asphalt composition to a temperature within the range of from about 350° F. to about 370° F.

6. The method of claim 1 in which the asphalt composition has a viscosity at a temperature of 360° F. within the range of from about 1200 to about 3000 cps.

7. The method of claim 1 in which the corrugated pipe is not preheated prior to the positioning of the corrugated pipe in the heated asphalt composition.

8. The method of coating a corrugated pipe, having crests and troughs, comprising:
   a. preparing an asphalt composition comprising asphalt and an added, asphalt-modifying polymer constituent which is within the range of from about 3 to about 20 percent by weight of the asphalt composition, the asphalt composition having a softening point within the range of from about 180° F. to about 250° F., and a viscosity at a temperature of 360° F. within the range of from about 600 to about 4000 cps,
   b. heating the asphalt composition to a temperature within the range of from about 350° F. to about 370° F.,
   c. coating the corrugated pipe by positioning at least a portion of the corrugated pipe in the heated asphalt composition for a time sufficient for the corrugated pipe to reach a temperature of at least 150° F., thereby applying a coating at the crests of the corrugations within the range of from about 40 mils to about 100 mils, the coating being effective to coat both the crests and the troughs of the portion of the corrugated pipe, with the coating thickness of the troughs being within the range of from about 100 percent to about 175 percent of the thickness of the coating at the crests, thereby producing a coated corrugated pipe with substantially the entire portion of the corrugated pipe that is coated with the asphalt composition reigning a corrugated appearance, and
   d. removing the pipe from the asphalt composition for cooling.

9. The method of claim 8 in which the thickness of the coating at the troughs of the corrugations is within the range of from about 100 percent to about 125 percent of the thickness of the coating at the crests of the corrugations.

10. The method of claims 8 in which the temperature of the corrugated pipe is lower than 110° F. immediately prior to the positioning of the corrugated pipe in the heated asphalt composition.

11. The method of claim 8 in which the asphalt composition has a viscosity at a temperature of 360° F. within the range of from about 1200 to about 3000 cps.

12. The method of claim 8 in which the corrugated pipe is not preheated prior to the positioning of the corrugated pipe in the heated asphalt composition.

13. The method of coating a corrugated pipe comprising:

a. preparing an asphalt composition comprising asphalt and an added asphalt-modifying polymer constituent which is within the range of from about 3 to about 20 percent, by weight of the asphalt composition the asphalt composition having a softening point within the range of from about 200° F. to about 250° F., and a viscosity at a temperature of 360° F. within the range of from about 600 to about 4000 cps, b. heating the asphalt composition to a temperature within the range of from about 340° F. to about 390° F., c. simultaneously coating and heating the corrugated pipe at least in the area of coating to a temperature of at least 170° F. by positioning at least a portion of the corrugated pipe in the heated asphalt composition, thereby producing a coated corrugated pipe with substantially the entire portion of the coated pipe that is coated with asphalt composition retaining a corrugated appearance, and d. removing the pipe from the asphalt composition for cooling.

14. The method of coating a corrugated pipe, having crests and troughs, comprising:

a. preparing an asphalt composition comprising asphalt and an added, asphalt-modifying polymer constituent which is within the range of from about 3 to about 20 percent by weight of the asphalt composition, the asphalt composition having a softening point within the range of from about 180° F. to about 250° F., and a viscosity at a temperature of 360° F. within the range of from about 600 to about 4000 cps, b. heating the asphalt composition to a temperature within the range of from about 340° F. to about 390° F., c. coating the corrugated pipe by positioning at least a portion of the corrugated pipe in the heated asphalt composition for a time sufficient for the corrugated pipe to reach a temperature of at least 150° F., the coating being effective to coat both the crests and the troughs of the portion of the corrugated pipe, with the coating thickness of the troughs being within the range of from about 100 percent to about 175 percent of the thickness of the coating at the crests, thereby producing a coated corrugated pipe with substantially the entire portion of the corrugated pipe that is coated with the asphalt composition retaining a corrugated appearance, d. removing the pipe from the asphalt composition, and e. draining excess asphalt from the pipe by tipping the pipe.

15. The method of claim 14 in which the coating at tile crests of the corrugations is within the range of from about 40 mils to about 100 mils.

16. The method of claim 14 in which the thickness of the coating at the troughs of the corrugations is within the range of from about 100 percent to about 125 percent of the thickness of the coating at the crests of the corrugations.

17. The method of claim 14 in which the temperature of the corrugated pipe is lower than 110° F. immediately prior to the positioning of the corrugated pipe in the heated asphalt composition.

18. The method of claim 14 in which the corrugated pipe is not subjected to a separate heating step immediately prior to the positioning of the corrugated pipe in the heated asphalt composition.

19. The method of claim 14 in which the corrugated pipe is not preheated prior to the positioning of the corrugated pipe in the heated asphalt composition.

* * * * *